Jan. 6, 1959     L. D. STATHAM     2,867,706

PRESSURE SENSITIVE RESISTOR

Filed May 17, 1954

INVENTOR
LOUIS D. STATHAM
BY
ATTORNEY.

United States Patent Office 2,867,706
Patented Jan. 6, 1959

2,867,706

PRESSURE SENSITIVE RESISTOR

Louis D. Statham, Beverly Hills, Calif., assignor to Statham Instruments, Inc., Los Angeles, Calif., a corporation of California Application May 17, 1954, Serial No. 430,227

7 Claims. (Cl. 201—63)

This application is a continuation-in-part of my co-pending applications Serial No. 354,294, now Patent No. 2,751,476 and Serial No. 354,295, now Patent No. 2,783,342 both filed May 11, 1953.

This invention relates to novel means for damping resiliently mounted masses, and is particularly concerned with means for damping flexible diaphragms on devices such as transducers and accelerometers, which diaphragms are subjected to oscillation.

In the transducers described in my above co-pending applications, one or more flexible diaphragms are mounted in a frame so that the diaphragms are free to move or oscillate in response to a force applied against them. The diaphragms are connected to a motion sensing device, for example, an electrical strain wire transducer, to indicate movement of said diaphragm and the extent of the force causing such movement.

It is an object of this invention to provide damping means for a resiliently mounted member, particularly a flexible diaphragm employed in a transducer, in order to improve the operation and accuracy of the instrument.

According to the instant improvements, a liquid film is disposed in direct contact with the diaphragm or resiliently mounted member. The diaphragm is supported in a frame and a narrow recess or gap is provided in the frame adjacent the diaphragm and forming a chamber, the recess being of sufficient size to permit oscillation of the diaphragm in response to an applied force or pressure, but sufficiently small to retain a damping liquid or oil by capillary action. This recess is filled with a damping liquid which is held in the recess in contact with the diaphragm by the aforementioned capillary force. The dimension, that is, depth, of this recess or fluid-retaining chamber depends on the surface tension and viscosity of the oil. This determines the maximum size of the gap between the frame and diaphragm and the permissible deflection of the diaphragm and permissible range of operation of the instrument. The damping is accomplished against the capillary force of the film. Thus, even though this oil chamber is in direct communication with the comparatively large interior spaces of the instrument, the liquid is prevented from passing from such narrow chamber to these interior spaces. It will be noted that in accordance with the invention it is only necessary to employ a very minor amount of damping liquid sufficient to form a fluid film which is retained in such narrow chamber adjacent the diaphragm.

Figure 1:
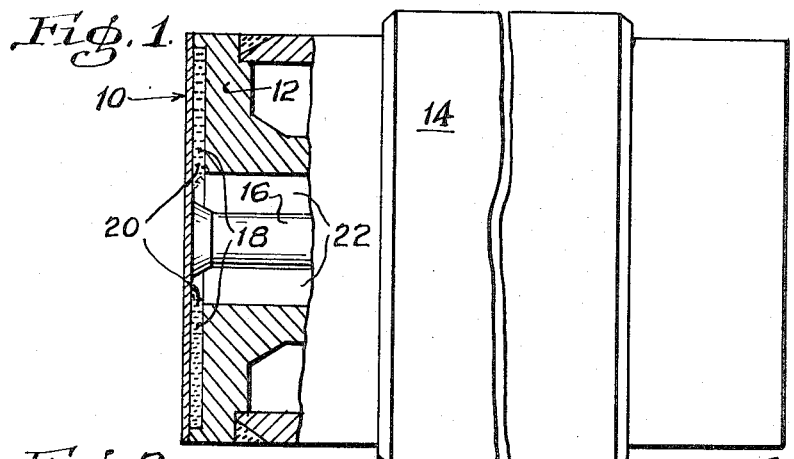
Fig. 1 is a schematic view, partly in section, illustrating the principle of the invention.

Referring to Fig. 1 of the drawing, a diaphragm 10 is mounted in the frame 12 of an instrument 14. The diaphragm is adapted to oscillate on the application of a force against it and a member 16 is secured to the diaphragm for movement therewith. Member 16 is in turn attached to a means which is actuated in response to movement of such member, e. g., a transducer or motion sensing device (not shown). A narrow recess 18 is formed in the frame 12, the recess being of a depth such as to permit oscillation of the diaphragm 10 in response to a force applied against it, and this recess is filled with a damping liquid 20. An example of a suitable damping liquid is methyl silicone oil. The recess is sufficiently shallow to retain the liquid therein by capillary action so that it is prevented from passing into the much larger interior space 22 of the device.

Figure 2:
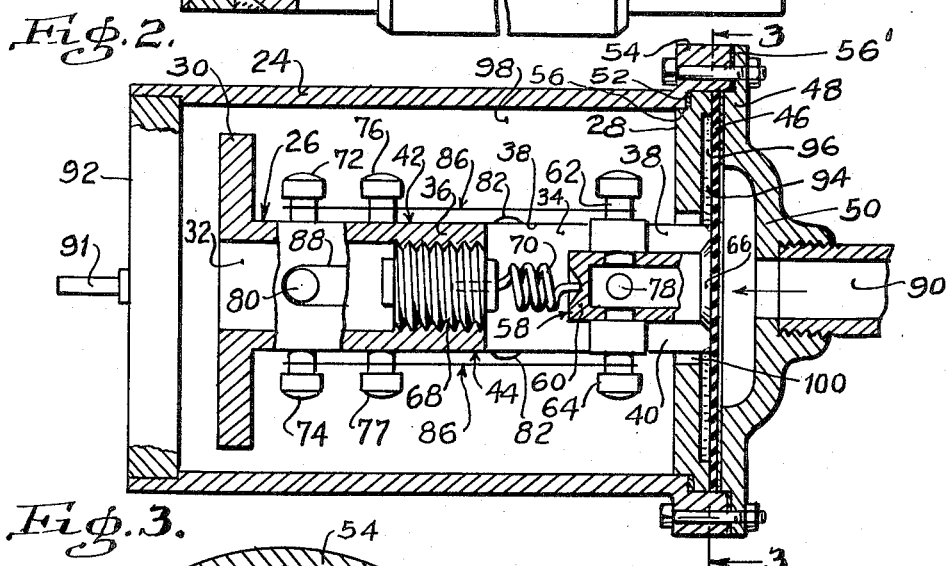
Fig. 2 is a sectional view of a transducer embodying the invention structure.
Figure 3:
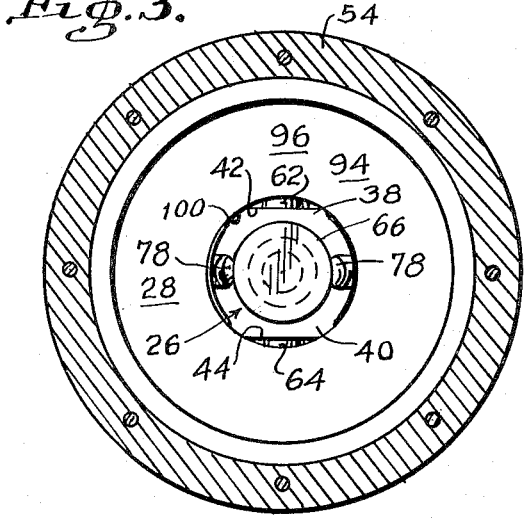
Fig. 3 is a section taken on line 3—3 of Fig. 2.

Fig. 2 shows a transducer including a case 24 in the form of a cylinder containing a cylindrical frame 26 squared off at the top and bottom to give parallel faces 42 and 44 and carrying circular end flanges 28 and 30. The frame is bored at its ends to give a recess 32 and a recess 34 separated by a wall 36. The recess 34 is intercepted by slots 38 and 40 formed in the parallel faces 42 and 44 of the frame.

Mounted upon flange or plate 28 is a flexible diaphragm 46 spot welded at its periphery to the flange 28 to give a fluid-tight joint. This flange 28 is clamped between the flange 48 of the cap 50 and the shoulder 52 of the flange 54 of the case 24. Suitable gaskets 56 and 56' are provided to make the fluid-tight joints.

Secured to the central portion of the diaphragm 46 is a hollow post 58 sealed at its end by an end wall 60. The post 58 carries two coaxial pins 62 and 64 positioned in the post 58 perpendicular to the axis thereof. The post extends perpendicular to the diaphragm and is mounted on a conical boss 66 positioned centrally of the diaphragm. Threaded into a bore in wall 36 is a screw 68 axially aligned with the post 58 and the diaphragm 46, and carrying a spring 70 which bears against the end 60 of the post 58. Two coaxial pins 72 and 74 are mounted in the parallel faces 42 and 44 of the frame, adjacent the flange 30. Pins 72 and 74 are aligned with the pins 62 and 64, respectively. Each of the parallel faces 42 and 44 carries two terminal pins 76 and two terminal pins 77, respectively. Mounted on one of the cylindrical side portions of frame 26 is a pin 78 and a pin 80, pin 78 being located adjacent plate 28 and pin 80 adjacent flange 30. Similar pins are located in corresponding positions on the other side portion of frame 26. Mounted on the upper side of frame 26 is a pair of terminal pins 82, and a similar pair of pins 82 are mounted in corresponding positions on the lower side.

A strain wire 86 is mounted in tension between pins 72 and 62, the ends of the loop terminating at the two pins 76, and another strain wire 86 is wound in tension between pin 74 and pin 64, the ends of this loop terminating at the two pins 77. A strain wire 88 is looped in tension about pins 78 and 80 on one side of frame 26, the ends of such loop terminating in pins 82, and another strain wire 88 is looped in tension between the pins on the other side of frame 26 corresponding to pins 78 and 80, the ends of this loop being connected to pins corresponding to pins 82. All pins are electrically insulated and the wires are out of contact with the frame.

It will be seen that the deflection of the diaphragm 46 by pressure introduced through the entrance port 90 in the cap 50 will cause the post 58 to move inwardly against the spring 70, causing the pins 62 and 64 to be moved in the slots 38 and 40. Since the pins 72 and 74 are stationary, the tension in the wires 86 will be relaxed. Pins 78 and 80 being stationary, the tension in the wires 88 is unaffected by the deflection of the diaphragm. The ends of the four loops or wires are connected to insulated terminals such as 91 on the cap 92, these terminals being connected in a Wheatstone bridge arrangement, the output of which is varied in accordance with the variations in tension of wires 86 in comparison to the fixed tension of wires 88.

Plate or flange 28 has a shallow annular recess 94 formed on the inner periphery of that face of the plate adjacent diaphragm 46. The face of such recess is parallel to the diaphragm. This recess forms a thin or narrow circular chamber 96 between plate 28 and the adjacent face of diaphram 46. The distance across the capillary gap or recess 94 in the instant embodiment, i. e., from plate 28 to diaphragm 46, is about .005". This, of course, may vary according to the invention. The chamber 96 communicates with the interior space 98 of the device through the space 100 between the inner end of plate 28 and frame 26. The annular recess 94 is of sufficient depth to provide a clearance permitting free oscillation of diaphragm 46 within predetermined limits. In chamber 96 is a liquid for damping the oscillatory movement of diaphragm 46, the above noted distance between the face of the recess and the diaphragm being sufficiently small so that the liquid is trapped in the chamber by capillary action and is thereby prevented from being forced into space 100 or space 98 by the oscillatory motion of the diaphragm, even though chamber 96 communicates freely with these spaces.

While I have described the instant improvements as applied specifically to a flexible diaphragm of a transducer, it is to be understood that the principles of the invention are also applicable to other types of devices embodying a resiliently mounted member.

While I have described a particular embodiment of my invention for the purpose of illustration, it should be understood that various modifications and adaptations thereof may be made within the spirit of the invention as set forth in the appended claims.

I claim:

1. A transducer which comprises a frame, a flexible diaphragm mounted on said frame, an electrical resistance strain wire stretched in tension between and connected to said frame and said diaphragm, a plate adjacent said diaphragm, a narrow gap between said plate and said diaphragm, said gap permitting oscillation of said diaphragm, and liquid in said gap forming a liquid film which is retained in said gap by capillary action.

2. A transducer comprising a frame, a flexible diaphragm mounted on said frame, a movable member centrally mounted on said diaphragm, wire mountings on said frame and said movable member, an electrical resistance strain wire stretched in tension between and mounted upon said wire mountings, a plate adjacent said diaphragm for supporting same, a shallow recess in said plate adjacent said diaphragm, said recess permitting oscillation of said diaphragm and forming a narrow chamber between said plate and said diaphragm, and liquid in said chamber providing a liquid damping film for said diaphragm, said film being retained in said chamber by capillary action.

3. A transducer comprising a housing, a frame, a flexible diaphragm mounted on said frame, a movable member centrally mounted on said diaphragm, wire mountings on said frame and said movable member, an electrical resistance strain wire stretched in tension between and mounted upon said wire mountings, a substantially circular plate in the form of a ring adjacent said diaphragm for supporting same, a shallow recess about the inner periphery of said ring adjacent said diaphragm, the face of said recess being parallel to said diaphragm, said recess being of sufficient size to permit oscillation of said diaphragm and sufficiently small to form a narrow chamber between said ring and said diaphragm, said chamber communicating with the interior of said housing, and liquid in said chamber providing a liquid damping film for said diaphragm, said liquid being retained in said chamber by capillary action.

4. In combination, a flexible diaphragm, a support means mounting said diaphragm and mounting a plate member having a surface adjacent a substantial area of a surface of said diaphragm and spaced therefrom by a narrow gap therebetween permitting oscillation of said diaphragm relative to said plate, and a liquid film supported in said gap by capillary action between said film and said two surfaces for damping the oscillations of said diaphragm by the capillary force of said film.

5. In combination, a flexible diaphragm, a support means mounting said diaphragm and mounting a plate member having a surface adjacent a substantial area of a surface of said diaphragm and spaced therefrom by a narrow gap therebetween permitting oscillation of said diaphragm relative to said plate, and a liquid film supported in said gap by capillary action between said film and said two surfaces for damping the oscillations of said diaphragm by the capillary force of said film, said film being free to change in dimension in response to said oscillations of said diaphragm.

6. In a transducer, a flexible diaphragm, a support means mounting said diaphragm and mounting a plate member having a surface adjacent a substantial area of a surface of said diaphragm and spaced therefrom by a narrow gap therebetween permitting oscillation of said diaphragm relative to said plate, a motion sensing means connected to said diaphragm, and a liquid film supported in said gap by capillary action between said film and said two surfaces for damping the oscillations of said diaphragm by the capillary force of said film, said film being free to change in dimension in response to said oscillations of said diaphragm.

7. In combination, a flexible diaphragm, a support means mounting said diaphragm, a plate member positioned closely adjacent said diaphragm having a surface adjacent a substantial area of a surface of said diaphragm and spaced therefrom by a narrow gap therebetween permitting oscillation of said diaphragm relative to said plate, and a liquid film supported in said gap by capillary action between said film and said two surfaces for damping the oscillations of said diaphragm by the capillary force of said film, said film being free to change in dimension in response to said oscillations of said diaphragm.

References Cited in the file of this patent

UNITED STATES PATENTS

| | | |
|---|---|---|
| 1,508,391 | Greenwood | Sept. 16, 1924 |
| 1,744,218 | Ford | Jan. 21, 1930 |
| 1,953,819 | Payne | Apr. 3, 1934 |
| 2,419,685 | Leslie | Apr. 29, 1947 |
| 2,453,549 | Statham | Nov. 9, 1948 |
| 2,466,327 | Rieber | Apr. 5, 1949 |